United States Patent [19]

Kohketsu

[11] Patent Number: 4,768,828
[45] Date of Patent: Sep. 6, 1988

[54] STRUCTURE FOR FIXING CHILDREN'S SEATS IN CARS

[75] Inventor: Shigeaki Kohketsu, Ayase, Japan

[73] Assignee: Ikeda Bussan Co., Ltd., Ayase, Japan

[21] Appl. No.: 29,699

[22] Filed: Mar. 24, 1987

[30] Foreign Application Priority Data

Mar. 31, 1986 [JP] Japan .............................. 61-47696[U]

[51] Int. Cl.$^4$ .............................................. A47C 1/08
[52] U.S. Cl. .................................... 297/250; 297/464
[58] Field of Search ............... 297/250, 216, 464, 468; 280/801, 808; 24/17 B, 17 R, 163 K, 265 AL

[56] References Cited

U.S. PATENT DOCUMENTS

| 3,136,579 | 6/1964 | Hunter | 297/250 |
| 3,547,489 | 12/1970 | Grieser | 297/250 |
| 4,186,961 | 2/1980 | Farrell, Jr. et al. | 297/484 X |
| 4,291,915 | 9/1981 | Cox | 297/468 |
| 4,569,108 | 2/1986 | Schwab | 24/17 B |

Primary Examiner—James T. McCall
Attorney, Agent, or Firm—Foley & Lardner, Schwartz, Jeffery, Schwaab, Mack, Blumenthal & Evans

[57] ABSTRACT

A structure for fixing a child's seat body on a car seat by means of a car seat belt wherein hook members are provided on both sides of the child's seat body and the pulling end of the seat belt is connected to the hook members through connectors which are hooked upon the hook members.

6 Claims, 3 Drawing Sheets

4,768,828

STRUCTURE FOR FIXING CHILDREN'S SEATS IN CARS

BACKGROUND OF THE INVENTION (a) Field of the Invention

The present invention relates to a structure for fixing children's seats in cars by means of a seat belt.

(b) Prior Art

In the case of using the child's seat in the car, safety must be established by fixing the body of the child's seat onto a car seat to prevent the child's seat from being loosened on the car seat by vibration and the like.

FIGS. 1 and 2 show one of the conventional fixing structures which have been provided to meet this need. The child's seat 1 comprises a back portion 2 made of synthetic resin, a seat portion 3 provided with side supports 7, and a frame 5 arranged on the backside of the back portion 2 and provided with a window-like clearance 4 through which a seat belt 6 is passed. A cut-away portion 8 is provided at the front end portion of each of the side supports 7. When the seat belt 6 is passed either through the clearance 4 or cut-away portions 8, the child's seat 1 can be reliably held on a car seat 9, with its backside forward in the former case or with its front side forward in the latter case, as shown in FIG. 2.

The back portion 2 is provided with upper and lower belt holes 10a, 10b and 11, 11. A retractor 12 of the emergency lock type is attached to the underside of the seat portion 3 of the child's seat 1 and a belt 13 for the child extends from the retractor 12. This child's belt 13 further extends passing behind the back portion 2 of the child's seat 1, through the upper belt holes 10a and 10a from behind, through the clearance 4, and again through the lower belt holes 11 and 11 from behind. The front end of the child belt 13 is connected to a protection pad 15 to which a tongue 14 is attached while a buckle 16 is attached to the seat portion 3. When the tongue 14 is engaged with the buckle 16, the child can be fixed, as shown in FIG. 2.

In the case of this fixing structure wherein the seat belt is passed through the clearance 4 in the child's seat body, however, it takes more time as compared with a case where an adult is seat-belted. In addition, it is extremely troublesome to fix the child's seat body at the predetermined position in the car.

SUMMARY OF THE INVENTION

The present invention is intended to eliminate the above-mentioned drawbacks and the object of the present invention is therefore to make the seat belt fixing more smooth and to enhance the handling of children's seats of this kind.

The present invention relates to a structure for fixing the child's seat body on a car seat by means of the seat belt wherein hook members are provided on both sides of the child's seat body and the pulling end of the seat belt is connected to the hook members through connectors.

The fixing of the child's seat body is attained by hooking one end of the connector by the hook member and then the pulling end of the seat belt by the other end of the connector.

The child seat can be carried by the connectors hooked by the hook members, and shopping bags and the like can be hung from the hook members.

According to the fixing structure of the present invention, the pulling end of the seat belt is connected to the hook members on the child's seat body through the connectors, so that the child's seat can be smoothly and reliably fixed even in a narrow car room.

Further, the child's seat body can be carried by the connectors hooked on the hook members and shopping bags and the like can be hung from the hook members, thereby enhance the children's seats of this kind to be easily and variously used.

DETAILED DESCRIPTION OF THE PREFERRED EMBODIMENT

An embodiment of the present invention will be described with reference to FIGS. 3 through 5.

Figure 3:
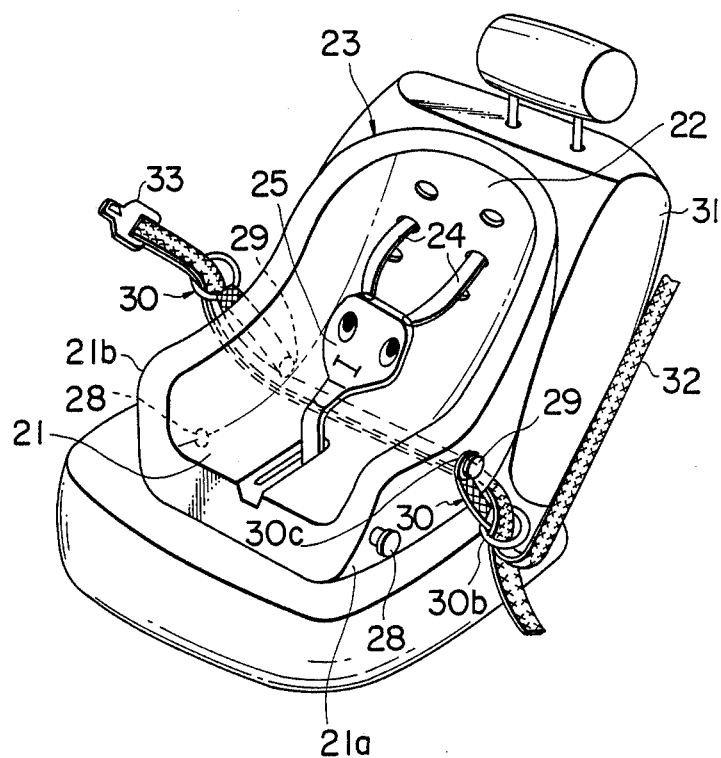
FIG. 3 is a perspective view showing a structure for fixing the child's seat according to the present invention.

FIG. 3 is a perspective view showing a structure for fixing the child's seat. The child's seat includes a child's seat body 23 of the bucket type which is formed by combining a seat portion 21 and a back portion 22 together, a pair of shoulder bands 24 extending through holes in the back portion 22, and a breast protection pad 25 detachably connected to foremost ends of the shoulder bands 24, wherein a child rested on the child's seat body 23 can be held there by the shoulder bands 24 and breast protection pad 25.

Both sides 21a and 21b of the seat portion 21 are provided with a pair of hook members 28 and 29, respectively. An end 30c of a connector 30 is hooked upon the hook member 29 while a tongue 33 which serves as the pulling end of a seat belt 32 attached to a car seat 31 is inserted through the other end 30b of the connector 30, and the tongue 33 is then locked into a buckle on the car floor. The child's seat body 23 can be thus fixed on the car seat 31.

Figure 4:
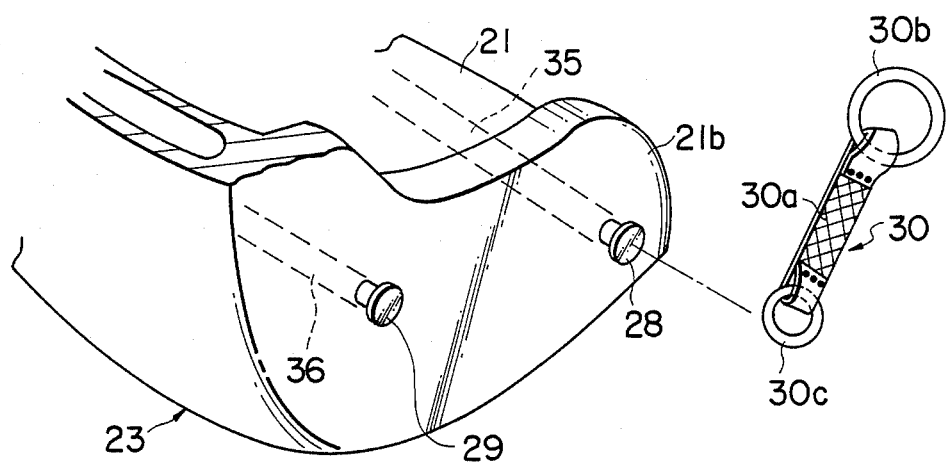
FIG. 4 is a perspective view showing hook members and connectors which are employed by the present invention.

As shown in FIG. 4, each of the hook members 28 and 29 consists of a head portion and a shaft portion and the head portion has a diameter larger than that of the shaft portion. The hook members 28 and 29 are fitted into both ends of reinforcements 35 and 36 extending left to right in the seat portion 21. The hook members 28 and 29 may have any shape if they allow one end of the connector 30 to hook on them. L-shaped or fallen-U-shaped hooks may be employed, for example.

Figure 1:
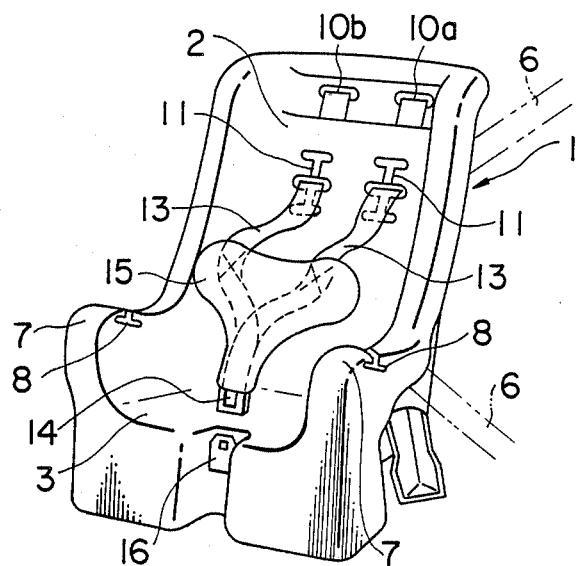
FIG. 1 is a perspective view showing the child's seat fixed on a car seat according to the conventional technique.
Figure 2:
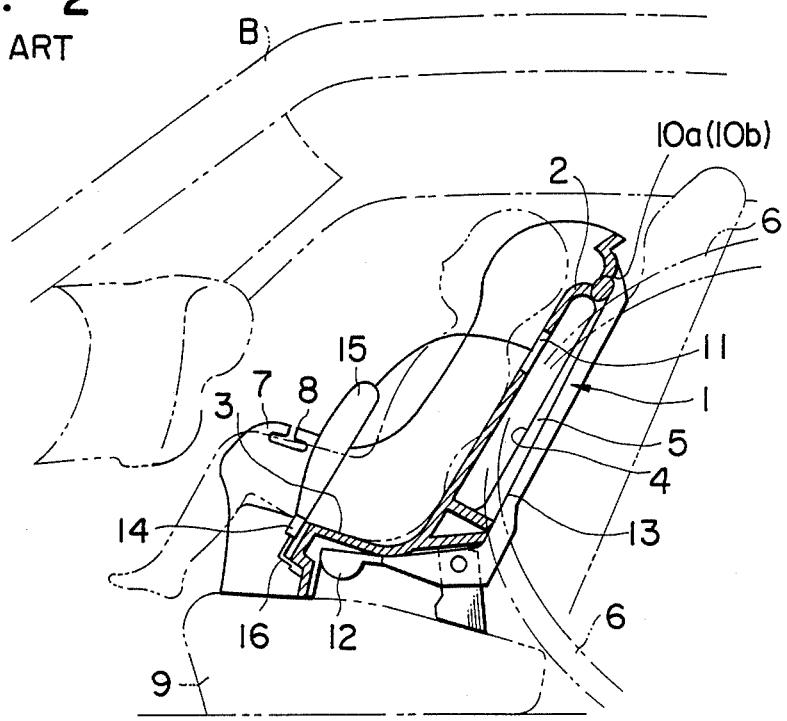
FIG. 2 is a sectional side view showing a structure for fixing the child's seat according to the conventional technique.

The connector 30 is of the flying ring type including a band 30a and rings 30b, 30c attached to both ends of the band 30a, respectively. The ring 30 is hooked upon the hook member 28 or 29, while the tongue 33 which serves as the pulling end of the seat belt 32 is inserted through the other ring 30b, so that the child's seat body 23 can be easily and reliably fixed on the car seat 31, as shown in FIG. 1.

Figure 5:
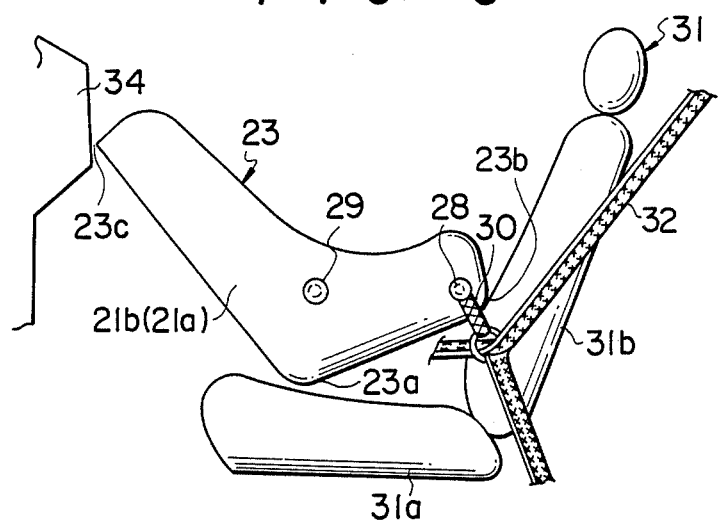
FIG. 5 is a side view showing the child's seat fixed with its backside directed forward.

FIG. 5 is a side view showing the child's seat body 23 fixed with its backside forward. In this case, a back bottom corner 23a of the child's seat body 23 is rested on a seat cushion 31a, a front bottom corner 23b thereof on a seat back 31b and an upper corner 23c thereof on a dashboard 34 in the car, while the seat belt 32 is passed through the connectors, as described above, of which one ends are hooked upon the hook members 28 on both sides 21a and 21b. Although only one side of the child's seat body 23 has been shown in FIG. 5, the other side thereof is similarly fixed by means of the seat belt 32.

I claim:

1. A structure for fixing a child seat on the car seat by means of a seat belt, comprising:

front and back hook members arranged on each of the outer sides of the child seat; and first and second connectors selectively hooked upon ones of the front and back hook members;

wherein the seat belt extends from one side to the other of the child seat, passing through one of said first and second connectors on one side, then extending through a space between the child seat and the car seat, and then passing through the other of said first and second connectors on the other side of the child seat.

2. A child seat fixing structure according to claim 1, wherein the seat belt the connectors are hooked upon the back hook members so that the child seat is fixed with its front side forward.

3. A child seat fixing structure according to claim 1, wherein the seat belt the connectors are hooked upon the front hook members so that the child seat is fixed with its front side backward.

4. A child seat fixing structure according to claim 2, wherein each of the connectors is of the flying ring type having rings at both ends of a belt, one of the rings being hooked upon the hook member and the other ring containing the seat belt.

5. A child seat fixing structure according to claim 3, wherein each of the connectors is of the flying ring type having rings at both ends of a belt, one of the rings being hooked upon the member and the other ring containing the seat belt.

6. A child seat fixing structure according to claim 1, wherein the seat belt is a combined lap and shoulder harness.

* * * * *